US011356368B2

(12) United States Patent
Mittal et al.

(10) Patent No.: US 11,356,368 B2
(45) Date of Patent: Jun. 7, 2022

(54) PINNING BI-DIRECTIONAL NETWORK TRAFFIC TO A SERVICE DEVICE

(71) Applicant: Arista Networks, Inc., Santa Clara, CA (US)

(72) Inventors: Anuraag Mittal, Livermore, CA (US); Tula Kraiser, Sunnyvale, CA (US); Nitin Karkhanis, Fremont, CA (US)

(73) Assignee: Arista Networks, Inc., Santa Clara, CA (US)

( * ) Notice: Subject to any disclaimer, the term of this patent is extended or adjusted under 35 U.S.C. 154(b) by 27 days.

(21) Appl. No.: 16/672,249

(22) Filed: Nov. 1, 2019

(65) Prior Publication Data

US 2021/0135993 A1    May 6, 2021

(51) Int. Cl.
*H04L 12/715* (2013.01)
*H04L 45/7453* (2022.01)
*H04L 45/24* (2022.01)
*H04L 45/02* (2022.01)

(52) U.S. Cl.
CPC .......... *H04L 45/7453* (2013.01); *H04L 45/04* (2013.01); *H04L 45/24* (2013.01)

(58) Field of Classification Search
None
See application file for complete search history.

(56) References Cited

U.S. PATENT DOCUMENTS

| | | | | |
|---|---|---|---|---|
| 6,108,754 | A  * | 8/2000 | Lindholm | G06F 9/52 718/107 |
| 6,345,313 | B1 * | 2/2002 | Lindholm | G06F 9/526 718/100 |
| 9,081,672 | B1 * | 7/2015 | Nemes | G06F 12/123 |
| 9,716,661 | B2 * | 7/2017 | Aybay | H04L 47/2441 |
| 2001/0034792 | A1 * | 10/2001 | Swildens | H04L 67/1034 709/238 |
| 2004/0148284 | A1 * | 7/2004 | Baker | G06F 40/274 |
| 2004/0177319 | A1 * | 9/2004 | Horn | G06F 16/26 715/201 |
| 2008/0084881 | A1 * | 4/2008 | Dharwadkar | H04L 45/50 370/392 |
| 2010/0306222 | A1 * | 12/2010 | Freedman | G06F 16/9014 707/769 |

(Continued)

*Primary Examiner* — Edan Orgad
*Assistant Examiner* — Emmanuel K Maglo
(74) *Attorney, Agent, or Firm* — Fountainhead Law Group P.C.

(57) ABSTRACT

Techniques for ensuring that, in the context of network traffic load-balanced across a plurality of service devices connected to a network device, all of the bi-directional traffic between a given pair of hosts residing in different domains is sent to the same service device, where a "domain" is a group of one or more hosts/subnets that is reachable by a service device via an interface of that device. In one set of embodiments, these techniques can include (1) creating a load balancer group on the network device for each domain defined on the service devices, such that the load balancer group for a given domain D includes all of the service device interfaces mapped to D, (2) enabling symmetric hashing with respect to each load balancer group, and (3) synchronizing the hash tables of the load balancer groups such that a given hash bucket (across all hash tables) maps to an interface of a single service device.

20 Claims, 7 Drawing Sheets

(56) References Cited

U.S. PATENT DOCUMENTS

| | | | |
|---|---|---|---|
| 2011/0252216 A1* | 10/2011 | Ylonen | G06F 9/52 |
| | | | 711/170 |
| 2011/0283013 A1* | 11/2011 | Grosser | H04L 67/1023 |
| | | | 709/232 |
| 2013/0201989 A1* | 8/2013 | Hu | H04L 47/125 |
| | | | 370/392 |
| 2014/0067983 A1* | 3/2014 | Gabriel | H04L 49/55 |
| | | | 709/208 |
| 2014/0074783 A1* | 3/2014 | Alsina | G06Q 10/10 |
| | | | 707/624 |
| 2014/0149723 A1* | 5/2014 | Junghans | G06F 9/3838 |
| | | | 712/226 |
| 2014/0214761 A1* | 7/2014 | Leake | H04L 49/109 |
| | | | 707/624 |
| 2014/0310390 A1* | 10/2014 | Sorenson, III | H04L 47/10 |
| | | | 709/223 |
| 2015/0095446 A1* | 4/2015 | Ramasubramanian | |
| | | | H04L 67/1008 |
| | | | 709/214 |
| 2016/0105502 A1* | 4/2016 | Shen | H04L 67/1063 |
| | | | 709/205 |
| 2016/0349995 A1* | 12/2016 | Venugopal | G06F 3/061 |
| 2017/0178600 A1* | 6/2017 | Wei | G09G 5/393 |
| 2017/0331739 A1* | 11/2017 | Sharma | H04L 63/02 |
| 2020/0007448 A1* | 1/2020 | Mizrahi | H04L 47/125 |
| 2020/0073993 A1* | 3/2020 | Mutreja | G06F 16/2358 |
| 2020/0084141 A1* | 3/2020 | Bengough | H04L 47/125 |
| 2020/0213156 A1* | 7/2020 | Cheng | H04L 49/354 |

\* cited by examiner

```
load_balancer_group Group1
destination 100.0.0.1
entry 0 10.0.1.2
entry 1 10.0.2.2
entry 2 10.0.3.2
```

*FIG. 5*

| Hash Table Bucket | Next-hop Address |
|---|---|
| 0 | 10.0.2.2 |
| 1 | 10.0.1.2 |
| 2 | 10.0.1.2 |
| 3 | 10.0.3.2 |
| 4 | 10.0.2.2 |
| 5 | 10.0.3.2 |

*FIG. 6*

PINNING BI-DIRECTIONAL NETWORK TRAFFIC TO A SERVICE DEVICE

BACKGROUND

In computer networks, service devices are commonly used to process (e.g., inspect, transform, filter, etc.) network traffic that is sent between hosts. Some service devices keep track of bi-directional state information on a per-network connection basis in order to carry out their functions. Accordingly, for a service device of this type, it is important that the service device receives both the forward and reverse traffic flowing between two hosts at the endpoints of a connection.

BRIEF DESCRIPTION OF DRAWINGS

FIG. 5 depicts an example load balancer group definition according to certain embodiments.

FIGS. 6, 7, and 8 depict example load balancer group tables according to certain embodiments.

DETAILED DESCRIPTION

Figure 1:
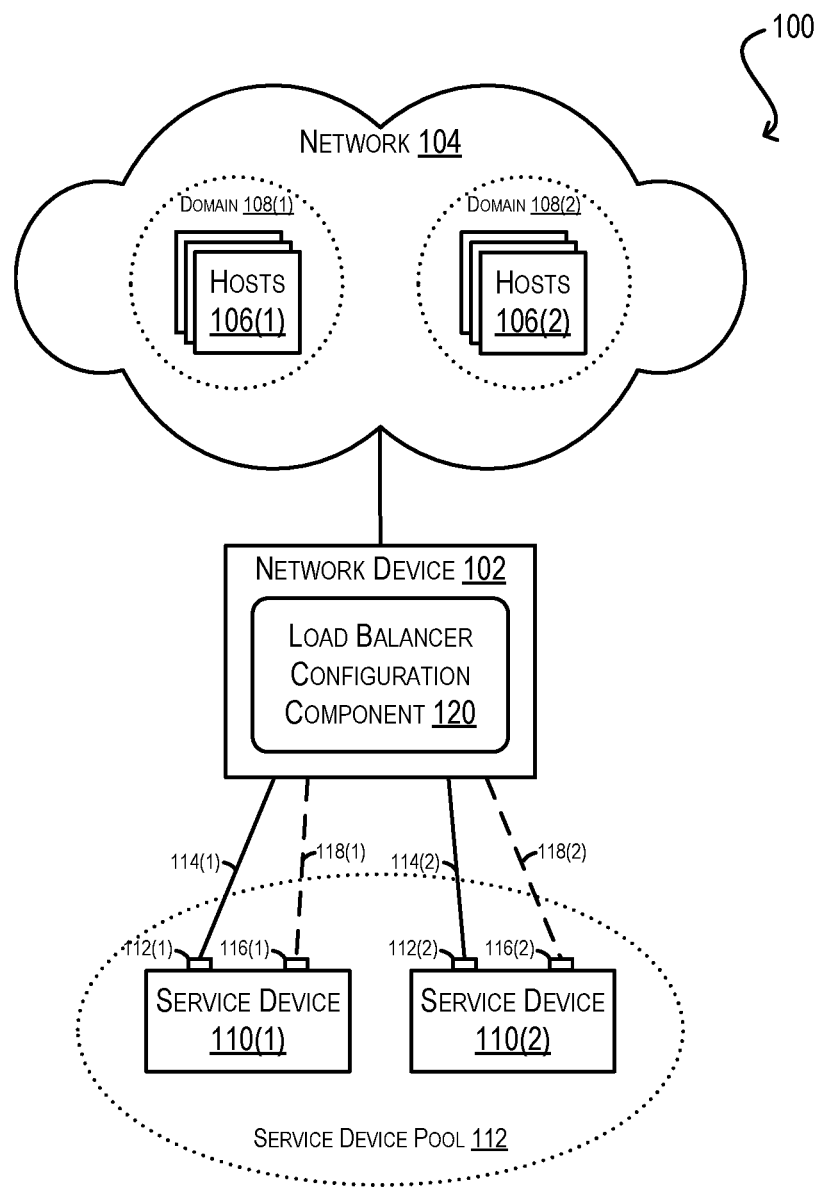
FIG. 1 depicts an example network topology according to certain embodiments.

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

Embodiments of the present disclosure are directed to techniques for pinning bi-directional network traffic to a single service device in a pool of load-balanced service devices. Consider a scenario in which several hosts are connected to a network device (e.g., network switch/router), which is in turn connected to two functionally identical service devices S1 and S2. In this scenario, it is desirable to implement some form of load balancing on the network device in order to distribute host-to-host traffic evenly across service devices S1 and S2. However, traditional hash-based equal-cost multipath routing (ECMP) or load balancing cannot ensure that all of the bi-directional traffic exchanged between a given pair of hosts will be distributed to the same service device S1 or S2. For instance, depending on the configuration of the ECMP/load balancer hash tables maintained on the network device, traffic sent from a host H1 to a host H2 may be distributed to service device S1 while traffic sent from host H2 to host H1 may be distributed to service device S2 (or vice versa). This means that neither S1 nor S2 will have a complete copy of the bi-directional state for the network connection between H1 and H2.

To address this, the techniques of the present disclosure enable the network device to (1) create a load balancer group for each domain defined on service devices S1 and S2, where a "domain" is a grouping of one or more hosts or network subnets that has some meaning to (and thus is typically defined on/by) a service device, and where the load balancer group for a given domain includes all of the service device interfaces assigned to that domain; (2) enable symmetric hashing with respect to each created load balancer group (which ensures that a packet originating from a source address of A and destined for a destination address of B will hash to the same hash value as a packet originating from a source address of B and destined for a destination address of A); and (3) synchronize the hash tables maintained by the network device for the created load balancer groups (which ensures that each common hash table bucket across the hash tables maps to a single service device).

With this high-level approach, the network device can guarantee that, in the course of load balancing host-to-host traffic across service devices S1 and S2, the network device will send both the forward and reverse traffic exchanged between a first host H1 and a second host H2 (i.e., H1-to-H2 traffic and H2-to-H1 traffic) to the same service device by virtue of the symmetric hashing and the synchronization between the load balancer group hash tables. Among other things, this advantageously enables each service device to implement stateful processing that relies on the maintenance of bi-directional state information for the network connections observed by the device, without requiring any modifications to the service device function.

1. Network Topology

FIG. 1 depicts a network topology 100 comprising a network device (e.g., network switch or router) 102 that implements the techniques of the present disclosure according to certain embodiments. As shown, network device 102 is communicatively coupled with a network 104 that includes two groups of hosts 106(1) and 106(2) residing in respective domains 108(1) and 108(2). In addition, network device 102 is communicatively coupled with two functionally identical service devices 110(1) and 110(2) that are part of a pool 112 of such service devices. Although exactly two domains and two service devices are depicted for purposes of explanation, the embodiments of the present disclosure may be applied to network topologies comprising any number of these entities.

As used herein, a "service device" is a physical or virtual device that is configured to perform intermediary processing (e.g., inspection, filtering, transformation, etc.) on network traffic transmitted between the endpoints (e.g., hosts) of a network connection. Common types of service devices include network firewalls, network probes/analyzers, intrusion detection devices, and so on. As indicated above, service devices 110(1) and 110(2) in pool 112 are functionally identical to one another (or in other words, are instances of the same service device type) in order to provide redundancy and/or capacity scaling within network topology 100.

Further, as mentioned previously, a "domain" is a grouping of one or more hosts or network subnets that has some meaning to, and thus is typically defined on/by, a service device. For instance, if service devices 110(1) and 110(2) are network firewalls, domains 108(1) and 108(2) in network 104 may correspond to firewall zones that are configured on service devices 110(1) and 110(2). In certain embodiments, it is assumed that a service device can only "reach" (i.e., accept network packets from and send network packets to) hosts in a given domain via one or more interfaces on the service device that are assigned to that domain; the service device cannot reach the domain via any other interfaces. For example, in FIG. 1, service devices 110(1) and 110(2) can only reach hosts 106(1) in domain 108(1) via respective service device interfaces 112(1) and 112(2) that are assigned to domain 108(1) and are connected to network device 102 via links 114(1) and 114(2) (shown using solid lines). Similarly, service devices 110(1) and 110(2) can only reach hosts 106(2) in domain 108(2) via respective service device interfaces 116(1) and 116(2) that are assigned to domain 108(2) and are connected to network device 102 via links 118(1) and 118(2) (shown using dashed lines).

Generally speaking, the role of network device 102 in topology 100 is to forward network traffic between the hosts of network 104 and, as part of this forwarding process, distribute the traffic to service devices 110(1) and 110(2) in pool 112 so that the service devices can carry out their intermediary operations on the traffic. For instance, upon receiving a network packet that originates from a host 106(1) in domain 108(1) and is destined for a host 106(2) in domain 108(2), network device 102 can select either service device 110(1) or 110(2) for processing the packet and can transmit the packet to the selected service device via a link/service device interface capable of carrying traffic from domain 108(1) (e.g., link 114(1)/service device interface 112(1) or link 114(2)/service device interface 112(2)). Network device 102 can then receive the processed packet back from the selected service device via a link/service device interface capable of carrying traffic to domain 108(2) (e.g., link 118(1)/service device interface 116(1) or link 118(2)/service device interface 116(2)) and can forward the packet onward to destination host 106(2) in domain 108(2).

As noted previously, it is desirable for network device 102 to perform this distribution of traffic to service devices 110(1)/110(2) in a load-balanced manner and thereby spread the traffic relatively evenly across the service devices. However, for various reasons, traditional hash-based ECMP/load balancing cannot ensure that network device 102 will distribute both the forward and reverse traffic exchanged between a pair of hosts to a single service device 110(1) or 110(2). This means that the service devices cannot employ processing which relies on the maintenance of per-connection bi-directional state information (such as, e.g., stateful firewall processing), because there is no guarantee that one service device will receive all of the bi-directional traffic for a given network connection.

To address the foregoing and other similar issues, network device 102 of FIG. 1 is enhanced to include a novel load balancer configuration component 120 in accordance with certain embodiments. As described in further detail below, load balancer configuration component 120 can cause network device 102 to carry out a configuration workflow that involves, inter alia, (1) creating a load balancer group for each domain defined on service devices 110(1) and 110(2) (e.g., domains 108(1) and 108(2)), where the load balancer group for a given domain includes all of the service device interfaces assigned to that domain; (2) enabling symmetric hashing with respect to each created load balancer group (which ensures that the forward and reverse network traffic exchanged between two hosts hash to the same value); and (3) synchronizing the hash tables associated with the created load balancer groups such that each hash table bucket, across all of the hash tables, maps to a single service device. With this approach, network device 102 can guarantee that, as part of load balancing the network traffic exchanged between hosts 106 in network 104 across service devices 110(1) and 110(2), all of the bi-directional traffic between a given pair of hosts will be sent to the same service device (and thus be "pinned" to that particular service device).

It should be appreciated that network topology 100 of FIG. 1 is illustrative and not intended to limit embodiments of the present disclosure. For example, in some embodiments topology 100 may include multiple network devices, each of which is connected to network 104 and service devices 110(1)/110(2) of pool 112 for redundancy. In these embodiments, an instance of load balancer configuration component 120 may be implemented in a substantially similar manner on each such network device in order to ensure that the bi-directional traffic for a given network connection is always load balanced to the same service device, regardless of which network device performs the load balancing operation. As another example, the various entities shown in network topology 100 may include other components/sub-components and/or implement other functions that are not specifically described. One of ordinary skill in the art will recognize other variations, modifications, and alternatives.

2. Hash-Based Load Balancing

Figure 2:
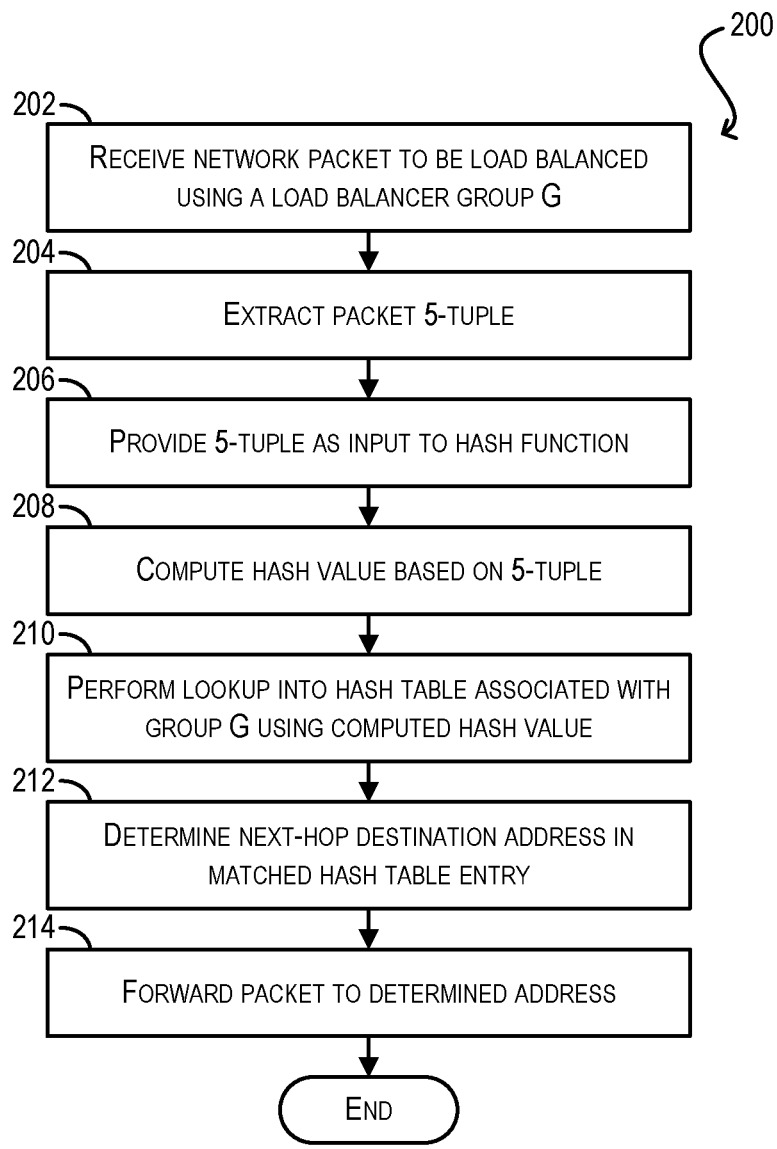
FIG. 2 depicts a workflow for load balancing a network packet using hash-based load balancing according to certain embodiments.

To provide context for the configuration steps performed by load balancer configuration component 120 of FIG. 1, FIG. 2 depicts a workflow 200 that provides an overview on how a network packet may be load balanced to a particular next-hop destination in a pool of next-hop destinations using hash-based load balancing. Workflow 200 assumes that the pool of next-hop destinations are configured as a load balancer group, which is essentially a data structure that identifies the network address of each entry in the pool and a criterion for applying the pool for load balancing purposes to incoming network traffic. For example, FIG. 5 depicts an example definition 500 of a load balancer group Group1 that identifies three possible next-hop destinations (10.0.1.2, 10.0.2.2 and 10.0.3.2 mapped to entry IDs 0, 1, and 2 respectively) and a criterion that indicates this group should be used to load balance incoming traffic destined for address 100.0.0.1.

Workflow 200 also assumes that the load balancer group is associated with a hash table comprising mappings between hash table buckets and the next-hop destination addresses identified in the load balancer group. As described below, a hash function is used to convert certain header fields of an incoming network packet into a hash value in the range [0..B], where B equals the total number of hash table buckets in the hash table. This hash value is then used to perform a lookup into the hash table (based on the hash table bucket field) in order to determine the next-top destination to which the network packet should be forwarded.

Generally speaking, for reasons pertaining to ensuring even distribution of network packets to next-hop destinations in the face of next-hop additions/removals, the total number of hash table buckets B in the hash table will be larger than the total number of next-hop destinations in the load balancer group. For example, in certain embodiments B may equal (next-hop count)×(a replication factor R), where R is dependent on the hardware on which the load balancing is performed. As a result, each next-hop destination in the load balancer group will typically appear multiple times in the hash table. For instance, FIG. 6 depicts an example hash table 600 for load balancer group Group1 defined in FIG. 5. In this example, B=6 and thus each of the three next-hop destinations in Group1 are replicated twice.

The manner in which next-hop destinations are mapped to hash table buckets is handled by a hash table distribution algorithm. Typically, the hash table distribution algorithm will operate on entry IDs (as indicated in the load balancer group definition) rather than on specific addresses, and thus will map entry IDs to hash table buckets. Once these entry ID-to-bucket mappings are determined by the algorithm, the entry IDs may be replaced with their corresponding next-hop addresses in the hash table, per the load balancer group definition.

Turning now to workflow 200, at block 202 a network packet can be received that should be load balanced using a particular load balancer group G defined on the receiving network device. For instance, assume the network packet is destined for address 100.0.0.1; in this case, it may be determined that the packet should be load balanced using Group 1 defined in FIG. 5. The selection of load balancer group G can also be based other header attributes or packet metadata, such as source port or associated VLAN for an untagged packet.

At block 204, a 5-tuple of header fields from the network packet can be extracted, where this 5-tuple consists of <source address, source port, destination address, destination port, protocol>. The 5-tuple can then be provided as input to a hash function h(x) (block 206), and hash function h(x) can be used to compute a hash value based on the 5-tuple (block 208). A common construction for hash function h(x) is k(x) modulo B, where k(x) is a checksum or hash function such as CRC-16 and where B is the total number of hash table buckets as mentioned previously.

At block 210, the computed hash value can be used to perform a lookup into the hash table associated with load balancer group G based on the table's hash table bucket field. For example, if the computed hash value is 5, the entry in the hash table corresponding to hash table bucket 5 can be matched.

Finally, at blocks 212 and 214, the next-hop address in the matched hash table entry can be determined and the network packet can be forwarded to that address.

3. Load Balancer Configuration Component Workflow

Figure 3:
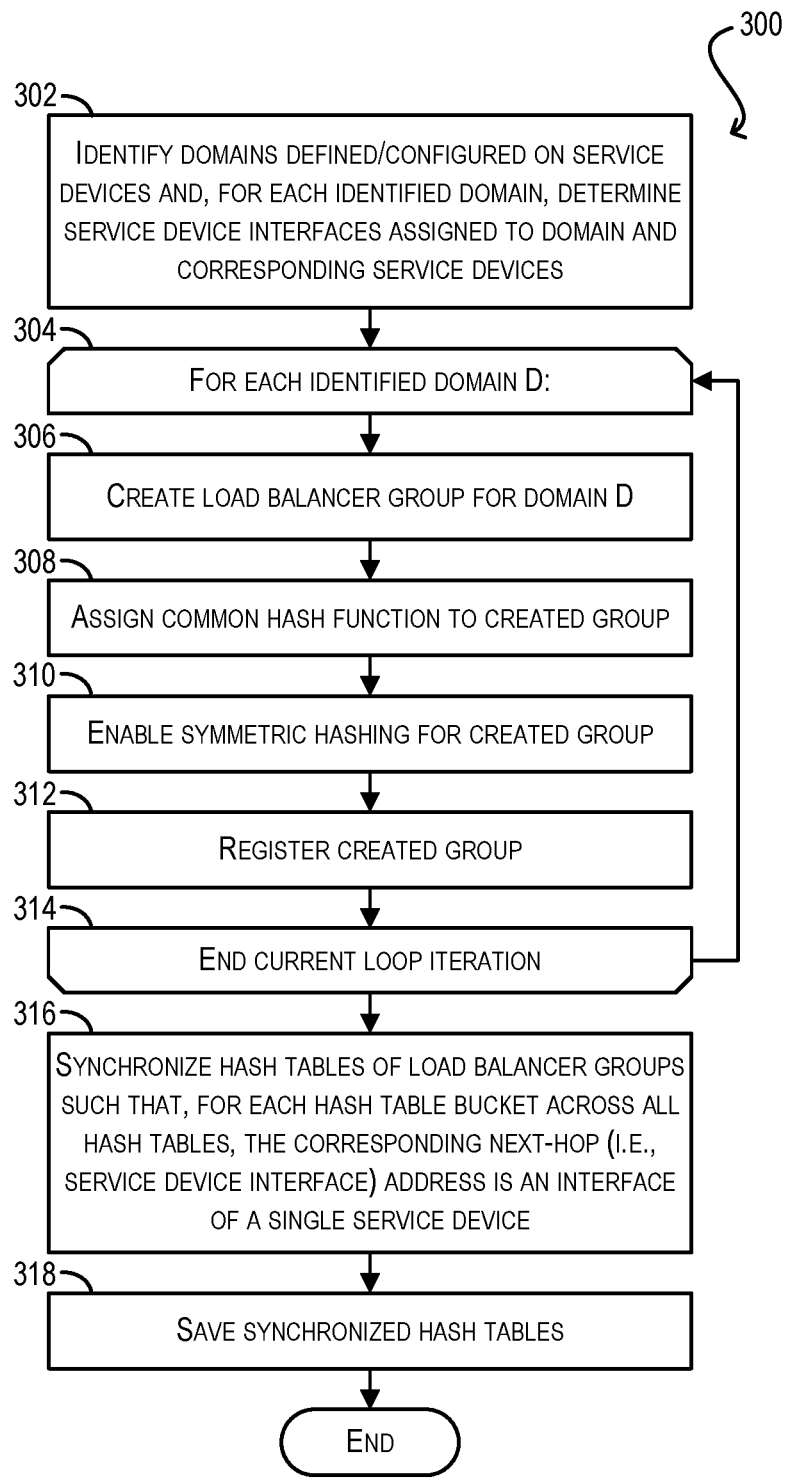
FIG. 3 depicts a load balancer configuration workflow according to certain embodiments.

With the foregoing overview of hash-based load balancing in mind, FIG. 3 depicts a workflow 300 that may be performed by load balancer configuration component 120 of FIG. 1 to configure load balancing on network device 102 in a manner that ensures the pinning of bi-directional traffic to a single service device in pool 112 according to certain embodiments. Workflow 300 may be initiated at, e.g., boot-up of network device 102 or in response to a user-provided command to enable load balancing on the device.

Starting with block 302, load balancer configuration component 120 can identify the domains defined/configured on service devices 110(1) and 110(2) of pool 112 and, for each identified domain, determine the service device interfaces (and corresponding service devices) assigned to that domain. For example, with respect to topology 100 of FIG. 1, load balancer configuration component 120 can identify domains 108(1) and 108(2) and can determine that service device interfaces 112(1) and 112(2) of service devices 110(1) and 110(2) respectively are assigned to domain 108(1) and service devices interfaces 116(1) and 116(2) of service devices 110(1) and 110(2) respectively are assigned to domain 108(2).

In one set of embodiments, load balancer configuration component 120 can carry out block 302 by retrieving domain configuration information that is entered into network device 102 by, e.g., a user or administrator. In other embodiments, load balancer configuration component 120 can carry out block 302 by communicating with one or more of service devices 110(1)/110(2) and/or with a central management server/platform that is configured to hold this information.

Once load balancer configuration component 120 has identified the domains and their respective service device interfaces, component 120 can enter a loop 304 for each identified domain D. Within this loop, load balancer configuration component 120 can create a load balancer group for current domain D (block 306). In various embodiments, this can involve creating a definition for the load balancer group per FIG. 5 that includes (1) a unique group name, (2) a mapping between an entry ID and each service device interface address that is assigned to domain D, and (3) a criterion indicating that the created group should be applied to incoming network traffic originating from domain D.

For instance, if domain D is domain 108(1) of FIG. 1, the created load balancer group definition can include a unique name for the group (e.g., "G1"), a first mapping between an entry ID 0 and the address of service device interface 112(1), a second mapping between an entry ID 1 and the address of service device interface 112(2), and a criterion indicating that group G1 should be applied to incoming network traffic originating from domain 108(1). Similarly, if domain D is domain 108(2) of FIG. 1, the created load balancer group definition can include a unique name for the group (e.g., "G2"), a first mapping between an entry ID 0 and the address of service device interface 116(1), a second mapping between an entry ID 1 and the address of service device interface 116(2), and a criterion indicating that group G2 should be applied to incoming network traffic originating from domain 108(2).

At blocks 308 and 310, load balancer configuration component 120 can assign a common hash function (e.g., h(x)) to the load balancer group created at block 306 and can enable symmetric hashing with respect the load balancer group. The use of a common hash function for this load balancer group and all other load balancer groups created within loop 304 ensures that a given hash input (e.g., packet 5-tuple) will result in the same hash value for all of the groups.

Further, the enablement of symmetric hashing ensures that a packet 5-tuple having a source address of A and a destination address of B will result in the same hash value as a packet 5-tuple having a source address of B and a destination address of A. Stated another way, symmetric hashing guarantees that both the forward and reverse traffic between two endpoints/hosts will hash to the same hash value. In one set of embodiments, symmetric hashing can be implemented by ensuring that the source and destination addresses are presented to the hash function according to a canonical ordering, which will be the same regardless of whether the source and destination addresses are swapped. In other embodiments, other techniques (such as, e.g., calculating a composite value based on the source and destination addresses and presenting that composite value as input to the hash function) may be employed.

At block 312, load balancer configuration component 120 can register the created load balancer group with network device 102, which can cause appropriate data structures for the group (including the group's hash table) to be created/allocated in the working memory of device 102. Load balancer configuration component 120 can then reach the end of the current loop iteration (block 314) and return to block 304 in order to repeat the loop for additional domains.

Upon completing all iterations of the loop, load balancer configuration component 120 will have created and configured appropriate load balancer groups for all of the domains identified at block 302. At this point, load balancer configuration component 120 can synchronize the hash tables of the created groups such that, for each hash table bucket across all hash tables, the corresponding next-hop address (i.e., service device interface address) mapped to that hash table bucket will be an address of a single service device (block 316). For instance, assume load balancer groups G1 and G2 are created for domains 108(1) and 108(2) respectively as noted above and assume that each of the hash tables for G1 and G2 have B=4 buckets (e.g., buckets 0, 1, 2, and 3). In this scenario, the synchronization performed at block 316 can ensure that, if bucket 0 in G1's hash table is mapped to service device interface 112(1) (which is an interface of service device 110(1)), then bucket 0 in G2's hash table will be mapped to service device interface 116(1) (which is an interface of the same service device 110(1)). Similarly, if bucket 1 in G1's hash table is mapped to service device interface 112(2) (which is an interface of service device 110(2)), the synchronization will ensure that bucket 1 in G2's hash table will be mapped to service device interface 116(2) (which is an interface of the same service device 110(2)). In this way, load balancer configuration component 120 can guarantee that, at the time of receiving bi-directional traffic between two hosts (which may reside in different domains and thus hit different hash tables on network device 102 in the forward and reverse directions), the traffic will be load balanced to the same service device, thereby pinning all of the traffic to the device.

In one set of embodiments, the synchronization at block 316 can be incorporated into the hash table distribution algorithm used to populate each hash table with bucket-to-entry ID mappings. In these embodiments, the synchronization can operate at the level of entry IDs and the entry IDs can subsequently be translated into service device interface addresses in accordance with the load balancer group definitions. In alternative embodiments, the synchronization at block 316 can be performed after all of the hash tables have been populated with initial entry IDs/interface addresses per the distribution algorithm.

Finally, at block 318, load balancer configuration component 120 can save the synchronized hash tables for use during the runtime of network device 102 and workflow 300 can end.

It should be appreciated that workflow 300 is illustrative and various modifications are possible. For example, although workflow 300 indicates that the hash table synchronization of block 316 is performed after all of the per-domain load balancer groups (and corresponding hash tables) have been created, in some embodiments the timing of these events may differ. For instance, in a particular embodiment the hash table of each created load balancer group may be synchronized to others in an incremental fashion within loop 304, as each new group is created.

Further, depending on the implementation, the ordering of certain blocks in workflow 300 may be swapped, certain blocks may be combined, and certain blocks may be omitted. One of ordinary skill in the art will recognize other variations, modifications, and alternatives.

4. Example Scenario

Figure 7:
Figure 8:

To further clarify the effect of the configuration steps shown in workflow 300 of FIG. 3 and described above, FIGS. 7 and 8 depict two example hash tables 700 and 800 that may be created for load balancer group G1 (corresponding to domain 108(1) of FIG. 1) and load balancer group G2 (corresponding to domain 108(2) of FIG. 1) respectively in accordance with workflow 300:

As can be seen in these figures, the entries of hash tables 700 and 800 are synchronized such that hash table bucket 0 in both tables maps to an interface of a single service device 110(1), hash table bucket 1 in both tables maps to an interface of a single service device 110(2), hash table bucket 2 in both tables maps to an interface of a single service device 110(2), and hash table bucket 3 in both tables maps to an interface of a single service device 110(1).

Assume that, with load balancer groups G1/G2 and their hash tables in place, network device 102 receives a forward packet from a host 106(1) in domain 108(1) destined for a host 106(2) in domain 108(2), and subsequently receives a reverse packet from host 106(2) to host 106(1) as part of the same connection/session. With respect to the forward packet from host 106(1) to host 106(2), network device 102 will extract a 5-tuple of the packet comprising <address of host 106(1), source port, address of host 106(2), destination port, protocol>, modify the 5-tuple into an alternative tuple/value t per the device's symmetric hashing implementation, provide tuple/value t as input into the common hash function noted in FIG. 3, and generate a hash value v. Assume that hash value v is 3. In this case, network device 102 will match the hash value with bucket 3 in the hash table of G1 and forward the packet to the corresponding service device interface 112(1), which is an interface of service device 110(1).

With respect to the reverse packet from host 106(2) to host 106(1), network device 102 will extract a 5-tuple of the packet comprising <address of host 106(2), source port, address of host 106(1), destination port, protocol> and modify the 5-tuple into the sane alternative tuple/value t as the forward packet in accordance with symmetric hashing. Network device 102 will then provide tuple/value t as input into the common hash function, which result in the generation of the same hash value v as the forward packet. Per the example above, assume that hash value v is 3. In this case, network device 102 will match the hash value with bucket 3 in the hash table of G2 and forward the packet to the corresponding service device interface 116(1), which is an interface of service device 110(1). Note that this is the same service device that received the forward packet, which means that both the forward and reverse traffic between host 106(1) and 106(2) have been successfully pinned to the same service device.

5. Link Failure Handling

In some scenarios, one of the links between network device 102 and service devices 110(1)/110(2) in pool 112 (i.e., links 114(1), 114(2), 118(1), and 118(2)) may go down or time out due to, e.g., network congestion, a physical disconnection, or other reasons. In these scenarios, it is preferable to avoid load balancing any new traffic to the service device at the other side of the failed link because any reverse traffic that needs to traverse back to network device 102 via the failed link will be blocked.

Figure 4:
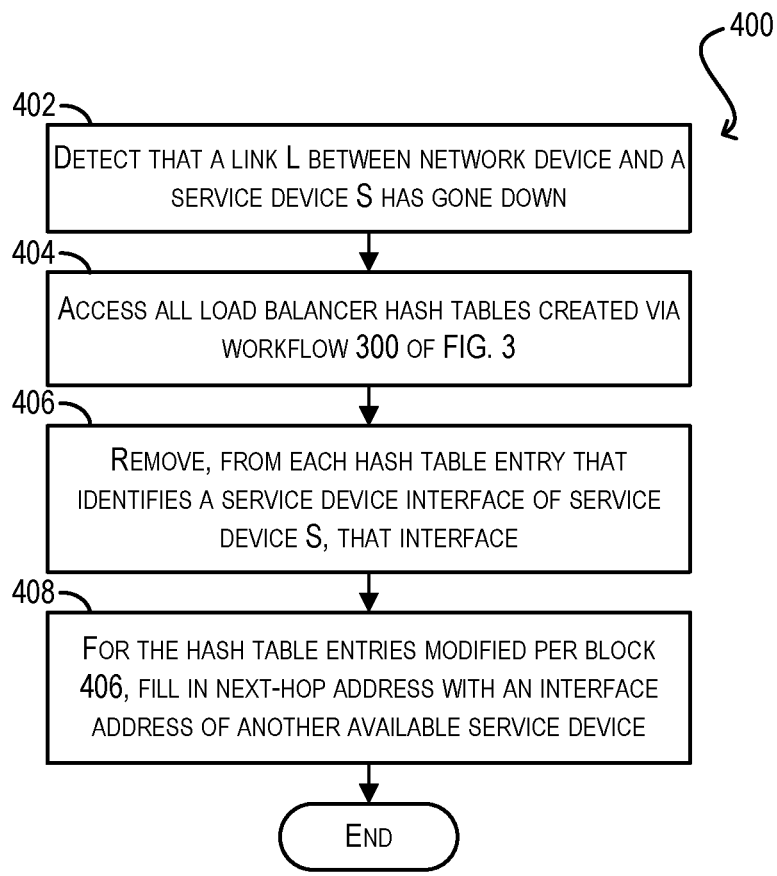
FIG. 4 depicts a workflow for handling link failures according to certain embodiments.

To address this, FIG. 4 depicts a workflow 400 that may be executed by network device 102 for automatically halting the load balancing of network traffic to such a service device according to certain embodiments. Workflow 400 may be implemented by, e.g., load balancer configuration component 120 of FIG. 1 or another component at the management layer/plane of network device 102.

Starting with block 402, network device 102 can detect that a link L between the network device and a particular service device S has gone down/failed. For instance, assume that link 114(1) between network device 102 and service device 110(1) has gone down.

At block 404, network device 102 can access all of the hash tables corresponding to the load balancer groups created via workflow 300. For instance, continuing with the example above, network device 102 can access the hash tables for groups G1 and G2.

At block 406, network device 102 can remove, from each hash table entry that identifies a service device interface of service device S, that service device interface. For example, for each entry in the hash tables for G1 and G2 that identifies either interface 112(1) or 116(1), network device 102 can delete the interface from that entry. This effectively prevents network device 102 for load balancing any new traffic to service device S.

Finally, for the hash table entries that have been modified per block 406, network device 102 can fill in the next-hop address fields for those entries using a service device interface address of another available service device in the pool. For example, for each entry in the hash tables for G1 and G2 where interface 112(1) or 116(1) has been deleted, network device 102 can fill in an interface of service device 110(2) (e.g., interface 112(2) or 116(2)).

6. Example Network Device

Figure 9:
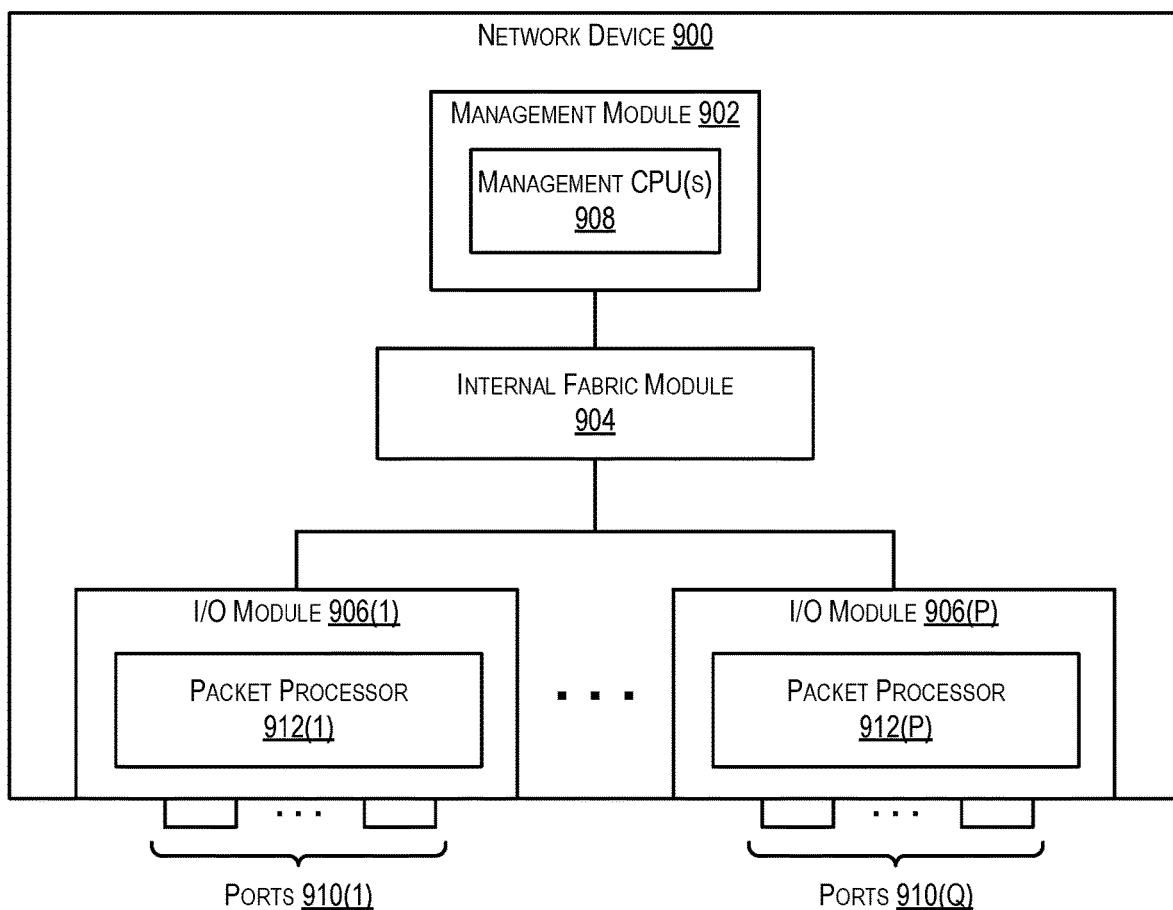
FIG. 9 depicts an example network device according to certain embodiments.

FIG. 9 depicts the architecture of an example network device (e.g., a network switch or router) 900 that may implement the techniques of the present disclosure according to certain embodiments. For example, network device 900 may correspond to network device 102 shown in FIG. 1.

Network device 900 includes a management module 902, an internal fabric module 904, and a number of I/O modules 906(1)-(P). Management module 902 includes one or more management CPUs 908 for managing/controlling the operation of the device. Each management CPU 908 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 904 and I/O modules 906(1)-(P) collectively represent the data, or forwarding, plane of network device 900. Internal fabric module 904 is configured to interconnect the various other modules of network device 900. Each I/O module 906 includes one or more input/output ports 910(1)-(Q) that are used by network device 900 to send and receive network packets. Each I/O module 906 can also include a packet processor 912, which is a hardware processing component that can make wire speed decisions on how to handle incoming or outgoing network packets.

It should be appreciated that network device 900 is illustrative and other configurations having more or fewer components than network device 900 are possible.

The above description illustrates various embodiments of the present disclosure along with examples of how aspects of these embodiments may be implemented. The above examples and embodiments should not be deemed to be the only embodiments and are presented to illustrate the flexibility and advantages of the present disclosure as defined by the following claims. For example, although certain embodiments have been described with respect to particular flowcharts and steps, it should be apparent to those skilled in the art that the scope of the present disclosure is not strictly limited to the described workflows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in hardware can also be implemented in software and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

What is claimed is:

1. A method comprising:
   receiving, by a network device, a first network packet originating from a first host of a first domain and destined for a second host of a second domain, the network device being connected to a plurality of service devices configured to process network traffic exchanged between the first and second domains;
   determining, based on source and destination addresses in the first network packet, a first hash value for the first network packet;
   matching, by the network device, the first hash value to a first entry in a first hash table, the first entry identifying a first interface of a particular service device in the plurality of service devices;
   sending, by the network device, the first network packet to the particular service device via the first interface;
   receiving, by the network device, a second network packet originating from the second host and destined for the first host;
   determining, based on source and destination addresses in the second network packet, a second hash value for the second network packet;
   matching, by the network device, the second hash value to a second entry in a second hash table, the first and second hash tables being synchronized such that the second entry identifies a second interface of the particular service device identified via the first entry of the first hash table; and
   sending, by the network device, the second network packet to the particular service device via the second interface.

2. The method of claim 1 wherein symmetric hashing is enabled with respect to the first and second hash tables, the symmetric hashing causing the first hash value to be identical to the second hash value.

3. The method of claim 2 wherein enabling symmetric hashing causes the network device to, upon receiving the first network packet or the second network packet:
   order the source address and the destination address in the first or second network packet according to a canonical ordering, the canonical ordering being the same regardless of whether the source address and the destination address are swapped.

4. The method of claim 2 wherein enabling symmetric hashing causes the network device to, upon receiving the first network packet or the second network packet:
   generating a composite value based on the source address and the destination address in the first or second network packet, the composite value being the same regardless of whether the source address and the destination address are swapped.

5. The method of claim 1 wherein the first hash table is associated with a first load balancer group defined on the network device, the first load balancer group causing the network device to load balance, using the first hash table, the network traffic across a first set of interfaces of the plurality of service devices that are assigned to the first domain, and
   wherein the second hash table is associated with a second load balancer group defined on the network device, the second load balancer group causing the network device to load balance, using the second hash table, the network traffic across a second set of interfaces of the plurality of service devices that are assigned to the second domain.

6. The method of claim 5 wherein the first load balancer group is associated with a definition including:
   a mapping between an entry identifier and the interface of the particular service device; and
   a criterion indicating that incoming network traffic which originates from the first domain should be load balanced using the first load balancer group.

7. The method of claim 5 wherein the second load balancer group is associated with a definition comprising:
   a mapping between a first entry identifier and said second interface of the particular service device; and
   a criterion indicating that incoming network traffic which originates from the second domain should be load balanced using the second load balancer group.

8. The method of claim 1 wherein the plurality of service devices are functionally identical service devices.

9. The method of claim 1 wherein the interface of the particular service device is assigned to the first domain and wherein said another interface of the particular service device is assigned to the second domain.

10. The method of claim 1 further comprising:
    detecting that a link between the network device and the particular service device has failed;
    identifying one or more first hash table entries in the first hash table that identify the first interface of the particular service device; and
    replacing the first interface of the particular service device in the one or more first hash table entries with a third interface of a second service device.

11. The method of claim 10 wherein the method further comprises:
    identifying one or more second hash table entries in the second hash table that identify the second interface of the particular service device; and
    replacing the second interface of the particular service device in the one or more second hash table entries with a fourth interface of the second service device.

12. A network device comprising:
    a processor; and
    a non-transitory computer-readable storage medium have stored thereon program code that, when executed by the processor, causes the processor to:
      create a plurality of load balancer groups, each load balancer group in the plurality of load balancer groups corresponding to a domain that is defined by one or more service devices communicatively coupled with the network device;
      assign a common hash function to each load balancer group in the plurality of load balancer groups;
      enable symmetric hashing with respect to each load balancer group in the plurality of load balancer groups; and
      synchronize a plurality of hash tables associated with the plurality of load balancer groups, the plurality of hash tables being synchronized such that each hash table bucket across the plurality of hash tables maps to a single service device in the one or more service devices.

13. The network device of claim 12 wherein each load balancer group in the plurality of load balancer groups includes service device interfaces assigned to the load balancer group.

14. The network device of claim 12 wherein each hash table of the plurality of hash tables comprises mappings between hash table buckets and next-hop destination addresses.

15. A non-transitory computer readable storage medium have stored thereon program code executable by a network device, the program code comprising:
    code that causes the network device to identify a plurality of domains defined on a plurality of service devices communicatively coupled with the network device;
    for each domain in the plurality of domains:
      code that causes the network device to identify, for each service device, one or more interfaces of the service device that are assigned to the domain;
      code that causes the network device to create a load balancer group for the domain;
      code that causes the network device to assign a common hash function to the load balancer group; and
      code that causes the network device to enable symmetric hashing with respect to the load balancer group; and
    code that causes the network device to synchronize a plurality of hash tables associated with the created load balancer groups such that a next-hop destination being mapped to a hash table bucket in the plurality of hash tables is an interface of a single service device in the plurality of service devices.

16. The non-transitory computer readable storage medium of claim 15 wherein the plurality of service devices are network firewalls and wherein the plurality of domains are firewall zones configured on the network firewalls.

17. The non-transitory computer readable storage medium of claim 15 wherein a first domain in the plurality of domains corresponds to a first subnet of a network and wherein a second domain in the plurality of domains corresponds to a second subnet of the network.

18. The non-transitory computer readable storage medium of claim 15 wherein each service device in the plurality of service devices maintains bi-directional state information for network connections observed by the service device.

19. The non-transitory computer readable storage medium of claim 15 wherein the network device identifies the plurality of domains by communicating with one or more of the plurality of service devices.

20. The non-transitory computer readable storage medium of claim 15 wherein the network device identifies the plurality of domains by accessing domain configuration information entered into the network device by a user.

* * * * *